United States Patent

Hobson et al.

[11] Patent Number: 5,768,780
[45] Date of Patent: Jun. 23, 1998

[54] SEALING OF CYLINDER HEADS

[76] Inventors: Dale Graham Hobson, 8 Spiral Walk, Woodmead Springs, Sandton, Transvaal Province; Johan Christoffel Adendorff, 42 Gail Street, Helderkruin, Transvaal Province, both of South Africa

[21] Appl. No.: 506,910

[22] Filed: Jul. 26, 1995

[51] Int. Cl.$^6$ ........................................................ B23P 15/00
[52] U.S. Cl. ..................... 29/888.061; 29/456; 123/193.3
[58] Field of Search .................................. 427/383.7, 192; 123/193.5, 193.3; 29/888.061, 888.06, 456

[56] References Cited

U.S. PATENT DOCUMENTS

| | | | |
|---|---|---|---|
| 3,648,572 | 3/1972 | Fischer | 123/193.3 |
| 4,387,678 | 6/1983 | Tholen | 123/193.5 |
| 4,391,238 | 7/1983 | Greier et al. | 123/193.3 |
| 4,469,060 | 9/1984 | Jordan | 123/193.3 |
| 4,505,238 | 3/1985 | Jordan | 123/193.3 |
| 4,513,703 | 4/1985 | Eckert | 123/193.3 |
| 4,749,594 | 6/1988 | Malikowski et al. | 427/192 |
| 5,050,547 | 9/1991 | Takahashi | 29/888.061 |
| 5,233,742 | 8/1993 | Ray et al. | 29/456 |
| 5,271,141 | 12/1993 | Vincent | 29/456 |
| 5,516,586 | 5/1996 | Singer et al. | 427/192 |

*Primary Examiner*—Larry I. Schwartz
*Assistant Examiner*—Marc W. Butler
*Attorney, Agent, or Firm*—Marshall, O'Toole, Gerstein, Murray & Borun

[57] ABSTRACT

This invention relates to a method of sealing a cylinder head shaped to fit against an end of a cylinder liner, to the cylinder liner by creating an annular ring on the cylinder side of the cylinder head, creating a matching a annular rebate in the cylinder head end of the cylinder liner, screw threading the ring and rebate and screwing the cylinder head and cylinder liner together. An interference fit on a separate portion of the ring and rebate seals the cylinder head and cylinder liner as they are screwed together.

10 Claims, 2 Drawing Sheets

SEALING OF CYLINDER HEADS

INTRODUCTION

This invention relates to a method of sealing cylinder heads to cylinder linings, and to completed assemblies of cylinders and engines, having such sealed cylinder heads and liners.

BACKGROUND TO THE INVENTION

Particularly where large engines are used, for example in locomotive or marine installations, the banks of cylinders have separate cylinder heads. The cylinders themselves are most often supplied with separate liners to allow for wear replacement. Typically in the diesel locomotive industry, such a liner is inserted from the bottom of a cylinder jacket and bolted tight to seal up against the abutting end of a cylinder head.

These engines are almost invariably water cooled, and the sealing between the cylinder head and cylinder liner is critical. If water leaks into the cylinder, the resultant hydraulic pressure can ruin the crank system.

OBJECT OF THE INVENTION

It is an object of this invention to provide a method of sealing cylinder heads to cylinder linings, and to provide such sealed cylinder heads and liners and engines fitted therewith.

SUMMARY OF THE INVENTION

In accordance with this invention there is provided a method of sealing a cylinder head to a cylinder liner, the cylinder head being shaped to fit against the end of a cylinder liner, and arranged to be sealed in this position by compression of the cylinder head against the cylinder liner, said method comprising: creating an annular ring on the cylinder end of the cylinder head, and a matching annular rebate in the cylinder liner, in order to have the ring fit within the rebate with opposing fitting surfaces, and, providing co-operating screw threading on a portion of the opposing fitting surfaces, and an interference fit on another portion of the opposing fitting surfaces.

Preferably the annular ring is arranged to fit within an internal annular rebate within the cylinder liner, and have external threading thereon, and preferably the threading is provided externally around the ring portion removed from the cylinder head, where the remaining portion of the opposing fitting surface forms the interference fit, with a corresponding threading and interference fit portions being provided on the annular rebate on the cylinder liner.

Further preferably, the interference fit is created by machining the opposing fitting surfaces.

A further feature of the invention provides for creating an anti fretting surface by copper plating the fitting surface on the ring which forms the interference fit, and for the thickness of the plating to be between 5 and 8 micrometers.

Further preferably, the cylinder head is sealed to the cylinder liner by cooling down the cylinder head to shrink it, heating the liner to expand it, and then screwing the parts together. Preferably the cylinder head is cooled down to approximately minus 30° C., and the liner is heated to approximately 250° C.

There is also provided for the ring portion to be created by machining off fitting lips on the end of the cylinder head and welding a ring portion thereon, or alternatively, building up the ring by welding.

There is provided for the cylinder head and liner to be dismantled by heating both of them to approximately 250° C., and cooling the cylinder head down to shrink it, and then unscrewing the cylinder head from the liner. Preferably the cylinder head is cooled down by liquid nitrogen.

The invention extends to a cylinder head and liner separately and as assembled having been arranged for sealing together or sealed together in accordance with the method described above.

BRIEF DESCRIPTION OF THE DRAWING

A preferred embodiment of the invention is described below by way of example only, with reference to the accompanying drawings, in which.

DETAILED DESCRIPTION OF THE DRAWING

Figure 1:
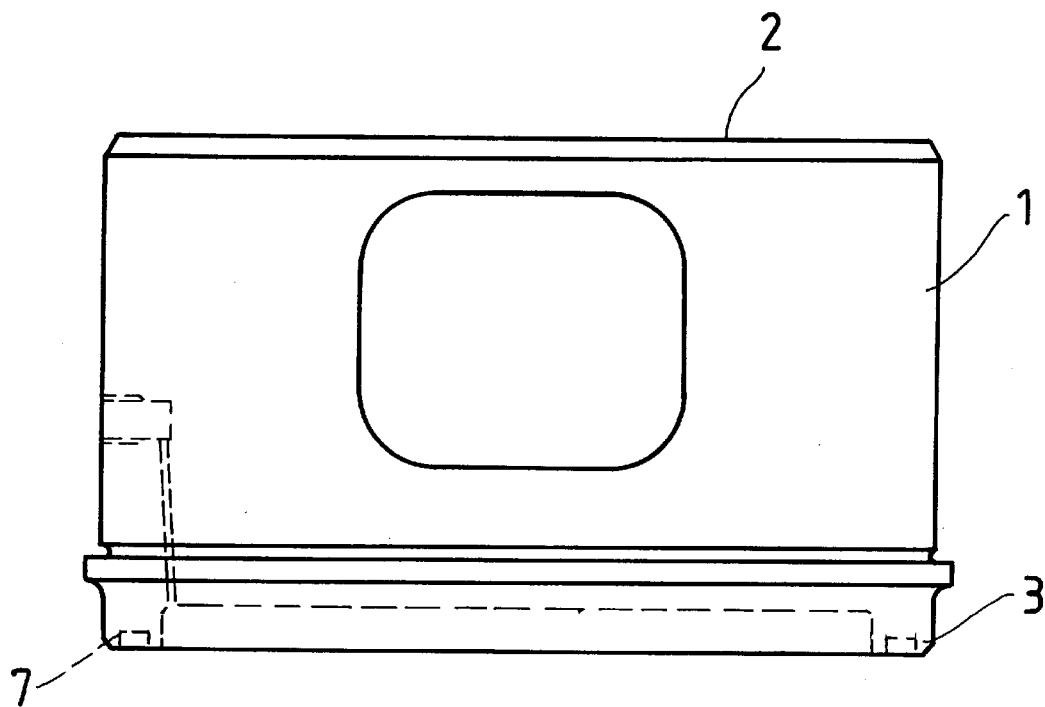
FIGS. 1 and 2 are respectively side views of a cylinder head and a liner prior to adaptation in accordance with the method of the invention for sealing thereof; and, FIG. 3 is an exploded diametric cross-sectional view of a cylinder head and cylinder lining to be fitted in accordance with the method of the invention.
Figure 2:
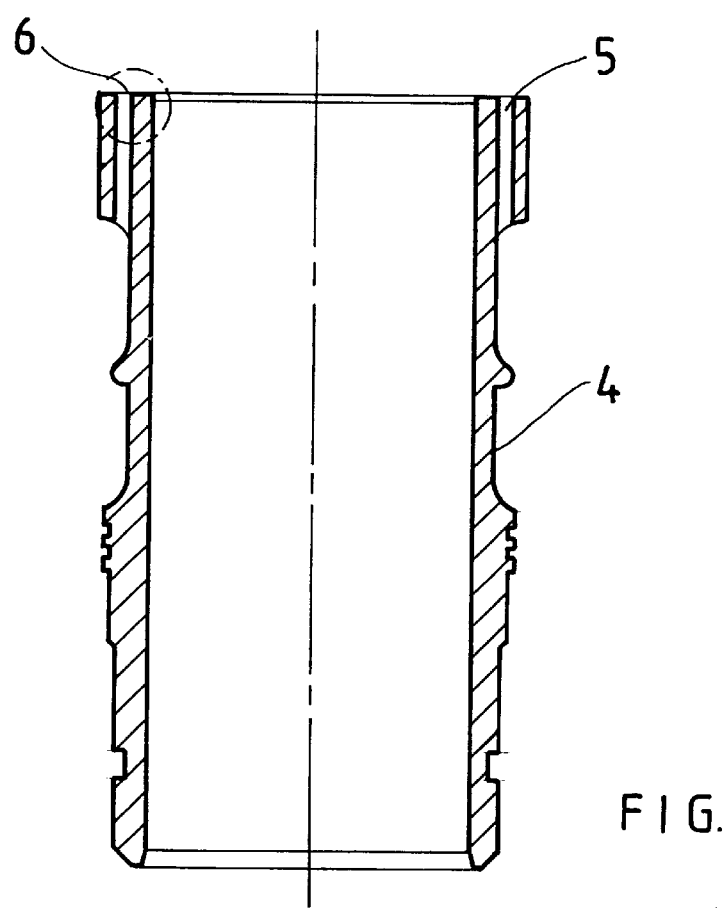

Referring to FIGS. 1 and 2, a cylinder head (1) has a head end (2), and a cylinder end (3) for fitment against a cylinder liner (4). The cylinder liner (4) has a cylinder head end (5) with annular formations (6) thereon for location within an annular groove (7) in the end face of the cylinder head side (3).

In normal fitment, as is known in the art per se, the cylinder head is located over the liner with the formations (6) within the groove (7). The liner is then bolted from the bottom end opposite the cylinder head, to tighten against the cylinder which is held from its head end (2).

Figure 3:
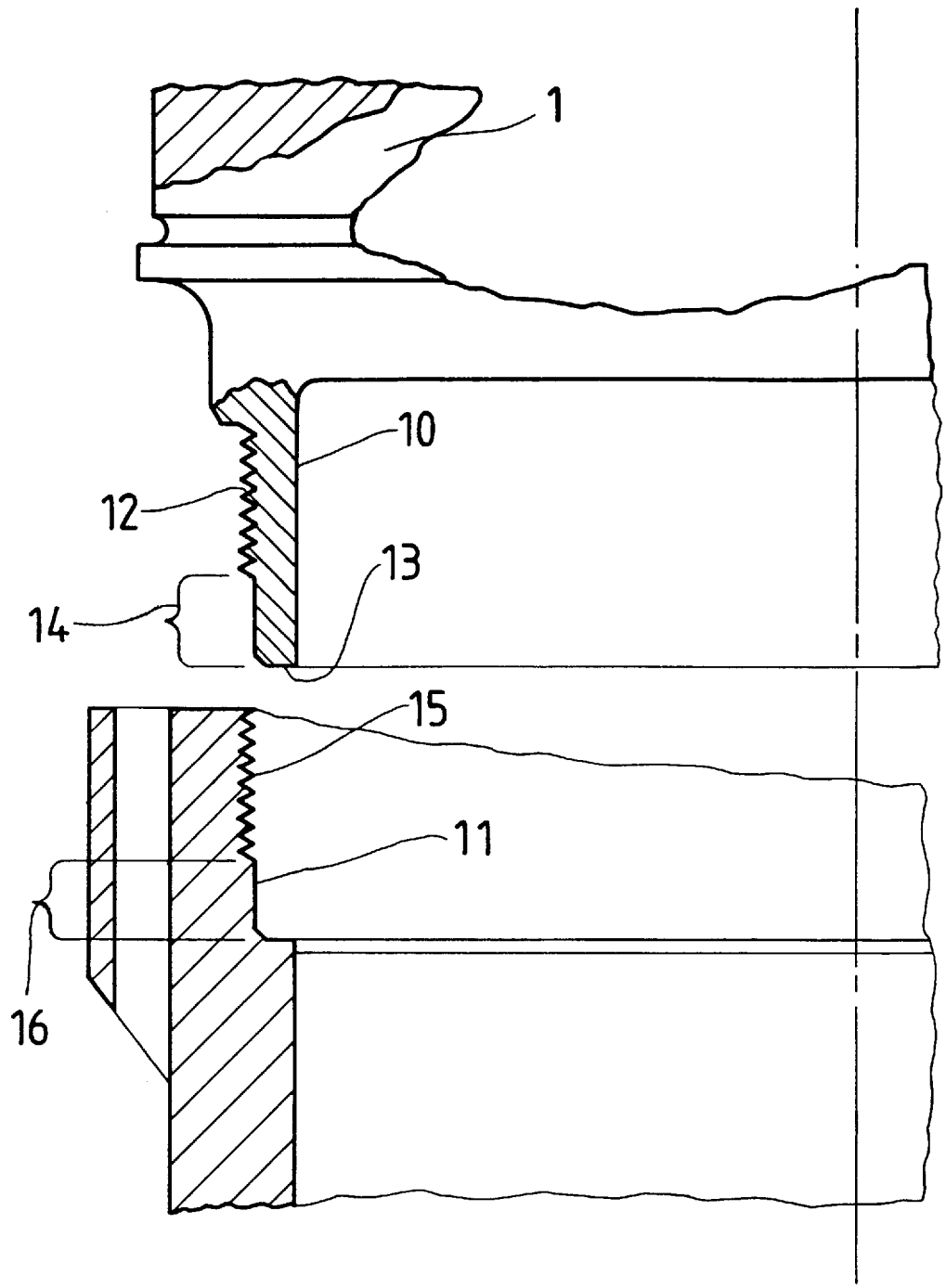

To provide a better sealing between cylinder and head, and particularly where refurbishment of a cylinder and/or head is taking place, the method as exemplified in FIG. 3 is provided.

Like numerals shown in FIG. 3 refer to like items as described with reference to FIGS. 1 and 2.

Accordingly, a cylinder head (1) is to be fitted to a cylinder liner (4), and in order to do this, the walls of the groove (7) of the head of FIG. 1, are machined away and a new ring section (10) is provided. This is done by building up welding, or by welding a ring to the head, and machining it.

A corresponding annular rebate (11) is provided on the inner walls of the liner by machining, to receive the ring (10) as an insert therein. The ring (10) is provided with external screw threading (12) at a position removed from the free end (13) of the ring by a portion (14).

Complimentary screw threading (15) is provided on the inner surface of the annular rebate (11), and a matching annular portion (16), at the innermost portion of the annular rebate, is provided to match the ring portion (14). The portions (14) and (16) are dimensioned to create an interference fit. The interference fit is attained by machining the portion (14) on the ring and the portion (16) of the annular rebate. To create an interference fit, the diameter of the portion (14) should be between 0,10 and 0,20 mm greater than the diameter portion (16). The lip (14) should be copper plated to a thickness of between 5 and 8 micrometers to provide an anti fretting surface.

In use, the cylinder head is fitted in sealing manner to the liner by heating the liner to approximately 250° C., and cooling the cylinder head to approximately minus 30° C. The parts are then rapidly screwed together and the differential heat expansion and contraction allows for the interference fit to be made. After cooling the parts are tested for sealing.

To dismantle the parts, both the cylinder head and liner are heated to approximately 250° C., and the cylinder head is then frozen by liquid nitrogen in situ, to shrink it and the parts then unscrewed.

It has been found in practice that the method enables cylinders and their liners of the type described to be provided with an accurate and relatively inexpensive method of positive sealing.

What we claim as new and desire to secure by Letters Patent is:

1. A method of refurbishing a seal between a pre-existing cylinder head and a cylinder liner wherein a cylinder head is to be fitted to the cylinder liner, the cylinder head being shaped to fit against an end of the cylinder liner, and arranged to be sealed in this position by compression of the cylinder head against the cylinder liner, said method comprising:

creating an outer annular ring on a cylinder end of the cylinder head, and a matching annular rebate in the cylinder liner, dimensioned to have the ring fit within the rebate with opposing fitting surfaces by a process including machining, providing co-operating screw threading on a portion of opposing fitting surfaces, and an interference fit on another portion of the opposing fitting surfaces, and threading the cylinder liner and the cylinder head together to seal the cylinder head to the cylinder liner.

2. A method of sealing a cylinder head to a cylinder liner as claimed in claim 1 in which the annular ring is arranged to fit within an internal annular rebate within the cylinder liner, and have external threading thereon, where the remaining portion of the opposing fitting surface forms the interference fit, with a corresponding threading and interference fit portions being provided on the annular rebate on the cylinder liner.

3. A method of sealing a cylinder head to a cylinder liner as claimed in claim 2 in which the external threading on the annular ring is provided externally around the ring portion removed from the cylinder head.

4. A method of sealing a cylinder head to a cylinder liner as claimed in claim 1 in which the interference fit is created by machining the opposing fitting surfaces.

5. A method of sealing a cylinder head to a cylinder liner as claimed in claim 4 in which an anti fretting surface is created by copper plating the fitting surface on the ring which forms the interference fit.

6. A method of sealing a cylinder head to a cylinder liner as claimed in claim 5 in which the copper is plated to a thickness of between 5 and 8 micrometers.

7. A method of sealing a cylinder head to a cylinder liner as claimed in claim 1 in which the cylinder head is sealed to the cylinder liner by cooling down the cylinder head to shrink it, and heating the liner to expand it, and then screwing the parts together.

8. A method of sealing a cylinder head to a cylinder liner as claimed in claim 7 in which the cylinder head is cooled down to approximately minus 30° C., and the liner is heated to approximately 250° C.

9. A method of sealing a cylinder head to a cylinder liner as claimed in claim 8 in which the ring portion is created by machining off fitting lips on the end of the cylinder head and welding a ring portion thereon.

10. A method of sealing a cylinder head to a cylinder liner as claimed in any one of claims 1 to 6 in which the ring portion is created by building up the ring by welding.

\* \* \* \* \*